United States Patent Office 3,652,595
Patented Mar. 28, 1972

1

3,652,595
MANDELAMIDINE DERIVATIVES AND PROC-
ESSES FOR PREPARING THE SAME
Louis Lafon, Paris, France, assignor to Société Anonyme
dite: ORSYMONDE, Paris, France
No Drawing. Continuation-in-part of application Ser. No.
778,315, Nov. 22, 1968. This application Apr. 23, 1970,
Ser. No. 31,365
Claims priority, application Great Britain, Nov. 29, 1967,
54,430/67; July 22, 1968, 34,947/68; France, Nov.
14, 1968, 173,696
Int. Cl. C07d 13/10
U.S. Cl. 260—340.5
6 Claims

ABSTRACT OF THE DISCLOSURE

This invention relates to mandelamidines of the formula:

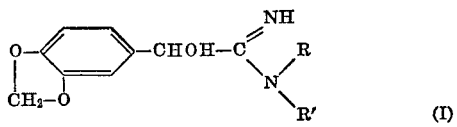

in which R represents a hydrogen atom, or a lower alkyl radical having not more than 3 carbon atoms, and R' represents a hydrogen atom, or an OH group or a lower alkyl radical having not more than 3 carbon atoms, their optically active isomers and their addition salts with physiologically acceptable acids. The compounds corresponding to the above formula have activities upon the cardiovascular system and are particularly of interest for the treatment of arterial hypertension.

This application is a continuation-in-part of application Ser. No. 778,315, filed Nov. 22, 1968, now abandoned.

The present invention relates to compounds of the mandelamidine series corresponding to the following formula:

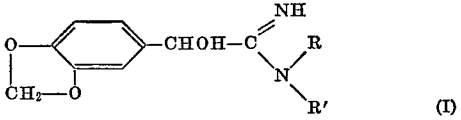

in which R represents a hydrogen atom, or a lower alkyl radical having not more than 3 carbon atoms, and R' represents a hydrogen atom, or an OH group or a lower alkyl radical having not more than 3 carbon atoms.

The invention includes the optically active isomers i.e. the dextro rotatory and levo rotatory isomers of said mandelamidines and this addition salts of physiologically acceptable acids, such as the hydrochlorides.

The applicants have discovered that compounds corresponding to the above formula have activities upon the cardiovascular system and are particularly of interest for the treatment of arterial hypertension.

The process of preparation of the mandelamidines of Formula I comprises the following stages:

(1) A lower aliphatic alcohol is reacted with a mandelonitrile of the formula:

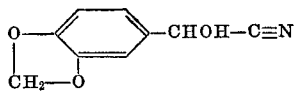

and the corresponding imino-ester is obtained.

(2) This imino-ester is reacted:

Either with gaseous ammonia (Operational Scheme No. I) and a mandelamidine of Formula I is obtained which, is not substituted at the nitrogen atom (in which R and R' are hydrogen atoms), or

2

With an amine of the formula

in which R, and R' each represent a lower alkyl radical (Operational Scheme No. II) and the corresponding mandelamidine of Formula I is obtained.

(3) To obtain mandelamidines of Formula I in which $R_4$ represents an —OH group (mandelamidoximes) a mandelamidine of Formula I not substituted at the nitrogen atom and obtained by the process described above is reacted with hydroxylamine (Operational Scheme No. III).

Work carried out industrially by the applicants has produced certain particularly advantageous embodiments of the process thus defined. These process embodiments comprise:

(a) The use of methanol as preferred aliphatic alcohol for production of the imino-ester, in the first stage of the process.

The advantages obtained by this improvement are:

Avoidance of the use of a reaction solvent or the dangerous washing constituted by ethanol;

Formation of the imino-methylester, the physical properties of which are modified with respect to the ethyl analogue and which is, in particular, denser and thus easier to isolate than the latter;

Substantial reduction in the quantities of solvents required.

(b) The use of heat, for a short period, to effect reaction of the amines with the imino-esters, in the second stage of the process.

According to another feature of the present invention, a novel process is proposed for the preparation of the initial 3,4-dioxymethylene-mandelonitrile, which comprises reacting piperonal with potassium cyanide in aqueous medium in the presence of sodium bisulphite as a catalyst and hydrochloric acid diluted to approximately pH 4.0 to 5.0 using a sealed reaction apparatus.

The advantages obtained by the novel process of preparation of the nitrile are as follows:

Sealing of the apparatus and reduction of the operations, thus avoiding risk of poisoning due to hydrocyanic acid;

The utilisation of sodium bisulphate as a catalyst, which allows operation at elevated concentrations of reactants and thus the use of an apparatus of small dimensions.

The following examples illustrate the present invention:

EXAMPLE 1

3,4-dioxy-methylene-mandelonitrile

A 20-litre three-necked flask provided with a central helix variable-speed agitation system, an accurate thermometer and a dropper was used. The sealed apparatus communicated with the exterior only by way of a bubble counter, the outlet from which was connected to a hydrocyanic acid trap. The following substances were introduced into the reactor:

1600 g. of 95% potassium cyanide (23.5 moles)
3000 g. of piperonal (20 moles)
10 litres of water.

Sealed closure of the apparatus was verified with the aid of the bubble counter. The flask was cooled externally with iced water, agitated to dissolve the cyanide, the piperonal was put into suspension and the temperatures equalised. Then 400 cc. of a solution of sodium bisulphite of density 1.32 was slowly added.

A solution of hydrochloric acid diluted to half (approximately 6 N) was slowly run in, the speed of introduction being regulated so that the temperatures never exceeded 15° C. The introduction of hydrochloric acid was stopped when the pH of the reaction medium reached 4.0 to 5.0.

The nitrile appeared quite rapidly in the form of clear brown oily droplets which settled spontaneously when agitation was stopped. This oily layer was aspirated by a syphon and washed with water three times in a flask having a lower outlet provided with a stirrer.

The nitrile recovered was dissolved in chloroform, then dried over anhydrous calcium chloride for 24 hours. After evaporation of the chloroform in vacuo, approximately 3200 g. of crude product of a brown-orange colour was obtained, having a refractive index at 20° C. of approximately 1.546.

The nitrile so obtained is impossible to distill even under reduced pressure, because it dissociates into an aldehyde and hydrocyanic acid. The purity of the nitrile obtained is sufficient however for it to be used as an intermediate in various syntheses. For example, when treated with anhydrous hydrogen chloride and alcohol in ethereal solution, it reacts to give the corresponding imino-ester with an overall yield based upon the piperonal of approximately 70%.

3,4-dioxy-methylenemandelamidine hydrochloride

Operational Scheme No. I.—Amidines Not Substituted on the Nitrogen Atom (R=R'=H)

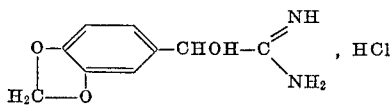

A solution of 0.4 mole of 3,4-dioxymethylene-mandelonitrile in 250 ml. of anhydrous ethyl ether and 40 ml. of absolute ethanol was saturated whilst cold with a stream of dry gaseous hydrogen chloride.

After saturation and standing for about 10 hr. at 0° C., the hydrochloride of 3,4-dioxymethylene-mandeliminoethyl ester which precipitated was filtered off and washed twice with 100 ml. of anhydrous ethyl ether.

The product so obtained was dissolved in 300 ml. of cold absolute ethanol. This solution was saturated at 0° C. with a stream of anhydrous gaseous ammonia.

After standing for 2 hours, crude 3,4-dioxymethylene-mandelamidine hydrochloride was precipitated by the addition in the cold of 300 ml. of anhydrous ethyl ether. The product was purified by crystallisation from a mixture of ethanol and ethyl ether.

The compound has the form of white crystals. It is soluble in water, methanol and ethanol and insoluble in ethyl acetate, ethyl ether, petroleum ether and benzene. The instantaneous melting point of this compound is 220° C. The yield of 3,4-dioxymethylene-mandelamidine hydrochloride, with respect to the nitrile used in the reaction initially, is 60% altogether.

EXAMPLE 2

3,4-dioxy methylene mandelamidine hydrochloride

In the present example methanol is used in place of ethanol in the first stage and 3,4-dioxy-methylene-mandelimino methyl ester is formed.

(a) Preparation of the imino-ester

The following substances were introduced into a 20-litre flask:

6535 g. of the crude nitrile of Example 1 prepared by the reaction of hydrocyanic acid with 6000 g. of piperonal (40 moles);
14 l. of anhydrous chloroform;
1400 g. of anhydrous methanol (44 moles).

The flask was provided with a central helix variable-speed agitation system, an accurate thermometer and a gas inlet tube. The hermetically sealed apparatus communicated with the exterior only via a bubble counter, the outlet of which was connected to a hydrochloric acid trap.

The flask was cooled externally by means of an iced water bath and agitated to equalise the temperature. Dry gaseous hydrogen chloride was then introduced via the gas inlet tube, the input being regulated so that all was absorbed and the temperature of the reaction medium remained below 25° C.

When the theoretical quantity of hydrogen chloride had been introduced and an output of gas was produced at the bubble counter, gas input was stopped and the reaction ceased. The hydrochloride of the imino-ester formed has the appearance of small, dense crystals which can be readily separated. It was recovered by filtration and washed with anhydrous acetone until the filtrate was no longer coloured. It was dried in an oven at about 35° C.

Approximately 7000 g. of a slightly yellow granular product was obtained having no definite melting point. This crude product is utilised for the operations according to (b).

(b) Preparation of the amidine

In the 20-litre flask described in (a) externally cooled with iced water, the following substances were introduced 7000 g. of the amino-ester obtained according to (a);
15 l. of anhydrous ethanol.

The materials were agitated in order to disperse them and to equalise the temperatures. Then dry gaseous ammonia was introduced via the gas inlet tube, the input being regulated so that all was absorbed and so that the temperature of the reaction medium remained at about 20° C. Passage of ammonia was stopped after reaction of an excess of 20–30% with respect to the theoretical amount.

The suspension of the amidine hydrochloride so obtained was left for 24 hours of ambient temperature. It was filtered and the amidine hydrochloride precipitated formed was washed. This was filtered and washed with acetone until the termination of colour in the washings. The product was dried in the oven and had the appearance of a pale grey granular powder weighing approximately 4950 g. This product was purified by recrystallisation from 10 l. of boiling water, slightly acidified with hydrochloric acid in the presence of animal black.

3950 g. of 3,4-dioxymethylene-mandelamidine hydrochloride was obtained, having the appearance of fine, white crystals having a solubility in water at 20° C. of approximately 5%.

The ionised chlorine titre (determined by argentimetry) and the nitrogen titre (measured by protometry in anhydrous media by perchloric acid) are always equal to 100±1%.

The yield after crystallisation was 80% and that of ammonolysis of the imino-ester was 59%.

The yield with respect to the piperonal used for synthesis of the nitrile was higher than 40%.

EXAMPLE 3

N,N-diethyl-3,4-dioxy methylene-mandelamidine hydrochloride

Operational Scheme No. II.—Amidines Substituted on the Nitrogen Atom

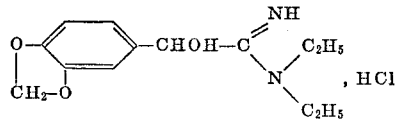

This compound was prepared by the addition of 0.1 mole of 3,4 - dioxymethylene mandelimino-ethylester hydrochloride obtained as described in Example 1, to a solution of 0.3 mole of diethylamine in 150 ml. of absolute ethanol and heating, under reflux, for 2 hours on a water-bath.

After evaporation under vacuum, the residue was taken up in 100 ml. of water and extracted with ethyl ether to eliminate the excess diethylamine. The aqueous solution was rendered alkaline by the addition of caustic soda. N,N-diethyl - 3,4 - dioxymethylene - mandelamidine base so displaced was extracted with three 50 ml. quantities of ethyl ether. This ethereal solution was washed with water, dried over anhydrous sodium sulphate, filtered and then evaporated under vacuum.

The amidine base so isolated was converted into the hydrochloride by the addition of a solution of HCl in ethyl ether. The precipitate obtained was isolated by filtration.

The crude N,N - diethyl - 3,4 - dioxymethylene-mandelamidine hydrochloride so obtained was purified by crystallisation from an ethanol-ethyl ether mixture.

The product so obtained has an instantaneous melting point of 160° C.

EXAMPLE 4

N,N-dimethyl-3,4-dioxymethylene-mandelamidine

Scheme No. II (HCl; M.P.=212° C.).

EXAMPLE 5

N-isopropyl-3,4-dioxymethylene-mandelamidine

Scheme No. II (HCl; M.P.=145° C.).

EXAMPLE 6

3,4-methylenedioxy-mandelamidoxime hydrochloride

Operational Scheme No. III—amidoxime.

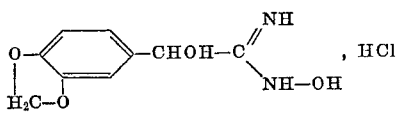

There is slowly added to a solution of 10 g. of 3,4-methylenedioxy - mandelamidine hydrochloride (0.043 mole), in 70 ml. of methanol, a solution of hydroxylamine, obtained by adding 3.4 g. of sodium methylate (0.063 mole) to 4.4 g. of hydroxylamine hydrochloride (0.063 mole) in a methanol medium then filtration after 30 minutes of agitation.

After 48 hours' rest, evaporation is effected in vacuo. 7.3 g. of 3,4 - methylenedioxy - mandelamidoxime is obtained (M.P. 103° C.) which is converted into hydrochloride in solution in ethanol.

The hydrochloride is precipitated by the addition of ethyl ether then purified by crystallisation in an ethanol ethyl acetate mixture.

The 3,4-methylenedioxy-mandelamidoxime hydrochloride obtained with a yield of 80% (8.5), is in the form of a white powder, soluble in water (at about 20%), methanol, ethanol and insoluble in ethyl ether, petroleum ether, benzene, ethyl acetate. The instaneous melting point is 165° C.

EXAMPLE 7 l- and d-(3,4-methylenedioxy)-mandelamidine hydrochlorides 29 g. of 3,4 - methylenedioxy-mandelamidine hydrochloride (0.125 mole), in suspension in 30 ml. of water are treated, cold, by a solution of 6 g. of sodium hydroxide (0.125 mole) in 30 ml. water.

The insoluble basic amidine released is rapidly isolated by filtration, centrifuged and dried in vacuo.

The racemic 3,4 - methylenedioxy - mandelamidine, obtained with a yield of 80% (19.5) has an instantaneous melting point of 118° C.

There is added to a solution of this product (0.1 mole) in 80 ml. ethanol, 15.2 g. of L-mandelic acid (0.1 mole), $\alpha_D^{20}=-156-5°$ (c.=5% in water). Heating is effected to 50° C. in order to dissolve everything, crystallisation is allowed to occur and filtering is carried out. 17.3 g. of a product Ia is obtained whose instantaneous melting point is from 160-2° C.

The filtrate evaporated to dryness leaves a residue which, added again to 100 ml. of a mixture, of equal volume, of acetone and ethylether, supplies after filtration 20 g. of a product IIa whose instantaneous melting point is from 132–4° C.

The product Ia (17.3) recrystallised in ethanol gives 13 g. of a product Ib (M.P. 168–9° C.). The evaporated filtrate leaves a residue which, treated by the acetone/ethyl ether mixture supplies 3.2 g. of a product IIb (M.P. 132° C.).

The product IIa treated by the acetone hot leaves 5 g. of an insoluble substance Ic, (M.P. 165–6°). After crystallisation of the acetone solution, 14 g. of a compound IIc is obtained (M.P. 135–7° C.).

Products Ib (13 g.) and Ic (5 g.) recrystallised in ethanol enable 16.2 g. of l-(3,4-methylenedioxy)-mandelamidine mandelate (compound I) to be obtained whose instantaneous melting point is from 168–9° C. and the rotatory power $\alpha_D^{20}=+8°$ (c.=0.5% in methanol).

L(—)(3,4-methylenedioxy)-mandelamidine hydrochloride

The l - (3,4 - methylenedioxy) - mandelamidine hydrochloride is prepared from the compound I which, in suspension in 30 ml. water, is treated by an excess of hydrochloric acid 5 N.

The l-mandelic acid released is extracted with three times 100 ml. ethyl ether. The aqueous solution, evaporated in vacuo, leaves a residue which is purified by crystallisation in an ethanol/ethyl ether mixture. 9.2 g. of l - (3,4 - methylene - dioxy) - mandelamidine hydrochloride are obtained with a yield of 63%, which is in the form of a white crystalline powder, the instantaneous melting point of which is 160° C. and which has a rotatory power $\alpha_D^{20}=-71°$ (c.=0.5% in methanol).

d-(3,4-methylenedioxy)-mandelamidine hydrochloride

The d - (3,4 - methylenedioxy) - mandelamidine hydrochloride is prepared from the compound II (12.5 g.) treated in the same way as described for compound I. 7.2 g. of d - (3,4 - methylenedioxy) - mandelamidine hydrochloride is obtained with a yield of 50%, in the form of prismatic white crystals, the instantaneous melting point of which is 160° C. and which has a rotatory power $\alpha_D^{20}=+69°$ (c.=0.5% in methanol).

EXAMPLE 8 l-(3,4-methylenedioxy)-mandelamidoxime hydrochloride

A solution of hydroxylamine, prepared from 4.2 g. of hydroxylamine hydrochloride (0.06 mole) and from 3.25 of sodium methylate (0.06 mole) in 50 ml. methanol, is added to a solution of 9.2 of l-(3,4-methylenedioxy)-mandelamidine hydrochloride prepared in Example 7 in 50 ml. methanol.

After 48 hours' rest, acidification is carried out with an ethanol solution of hydrochloric acid, evaporation is effected in vacuo, the residue is added to water again and the base is precipitated by the addition of sodium acid carbonate. After filtration, 7.4 of the basic amidoxime is obtained whose instantaneous melting point is 114° C.

This product dissolved in ethyl ether is treated by an ethanol solution of hydrochloric acid. The isolated hydrochloride is purified by crystallisation in an ethanol/ethyl acetate mixture.

The l - (3,4 - methylenedioxy) - mandelamidoxime hydrochloride obtained with a yield of 83% (8.2 g.) is in the form of white crystals, the instantaneous melting point of which is from 138–9° C., soluble in water, methanol, ethanol and insoluble in ethyl ether, petroleum ether, benzene, ethyl acetate. It has a rotatory power $\alpha_D^{20}=-42°$ (c.=0.5% in methanol).

EXAMPLE 9 d-(3,4-methylenedioxy)-mandelamidoxime hydrochloride d - (3,4 - methylenedioxy) - mandelamidoxime hydrochloride was prepared, according to the mode of operation described in Example 8, using 7.7 g. d-(3,4-methylenedioxy)-mandelamidine hydrochloride, prepared in Example 7.

The product obtained, with a yield of 76% (6.2) is in the form of a white powder, the instantaneous melting point of which is 138–9° C., soluble in water, methanol, ethanol and insoluble in ethyl ether, petroleum ether, benzene, ethyl acetate. It has a rotatory power $\alpha_D^{20} = +46°$ (c.=0.5% in methanol).

(A)

Toxicological and pharmacological study of the compound of Example 1 is described below using a sample prepared in the laboratory, reference sample No. 1.

Study of the acute toxicity in mice has been carried out

I.V. administration:
    Intravenous $DL_{50} = 120 \pm 8.7$ mg./kg. (104–138 mg./kg.).
    Symptoms—
        Exophthalamia, dypnoea, immediate death by respiratory arrest.

I.M. administration:
    Intra-muscular $DL_{50}$ ranges from 600 to 1000 mg./kg.
    Symptoms—
        Trembling, convulsions, exophthalmia, piloerection, pthosis, diminution of respiration.

Gastric administration:
    No mortality up to 1000 mg./kg.

Observations on animals which had received 300 mg./kg. of the product I.M.:
    Piloerection, phtosis, hypotermia (−5.5° C.).

The product is slightly tranquillising and it protects against mortality due to electric shock.

Study of the cardiovascular properties has been carried out as follows (1) Isolated rabbit heart perfused according to the Langendorf method Three isolated rabbit hearts subjected to spasm by barium chloride were perfused with a solution of the product at 10 and 100 mg./l. No clear action was noted on the coronary output nor upon the ventricular amplitude and cardiac rhythm.

(2) Isolated guinea pig auricle

The organs were maintained in Lockes liquid at 30° C. aerated by carbogen.

On two organs (right auricle) in doses of 1.2 to 12 micrograms/ml., the product was without action upon the amplitude and rhythm and did not modify the actions of isoprenaline and 1,1-dimethyl-4-phenyl-piperazinium iodide (DMPP) (except in one case where the action of isoprenaline on the amplitude was augmented).

(3) Areterial pressure in anaesthetised rats

The animals were anaesthetised with urethane. Injections were effected by means of a cathether fixed in the jugular. The A.P. was measured at the carotid.

On 2 rats at 12 mg./kg. I.V. (⅒ $DL_{50}$ I.V. mice), the product caused a hypotensive peak followed by elevation of the pressure by 14% on average for 3 minutes.

(4) Arterial pressure in anaesthetised rabbits

The rabbits were anaesetised with a chloraloseurethane mixture. In one rabbit, the product at 12 mg./kg. I.V. (⅒ $DL_{50}$ I.V. mice):

Caused a hypotension of 23% for 3 minutes, decreased by 32% the hypertensive action of noradrenaline,
Did not modify the actions on the pressure of angiotensine, isoprenaline and acetylcholine.

(5) Arterial pressure in awakened rats (a) Study by single administration: The animals were carrying aortic catheters located at least 24 hours prior to the test.

(A) I.M. administration—Normotensive rats

At 50 mg./kg. on 4 rats, the product diminished the pressure up to (on average). This maximum was attained after 30 minutes.

The initial pressure was attained again after 1 hour 30 minutes (the hypotensive action is reproducible).

At 300 mg./kg. on 2 rats, it diminished the pressure on average by 59% (maximum) 4 hours after injection. The action showed 10 minutes after injection. The pressure did not increase.

(B) Buccal administration

At 50 mg./kg. on a normotensive rat, slight hypotension was immediate and lasted 1 hour 30 minutes. On a hypertensive rat, a slow hypotension was noted which lasted for about 3 hours.

At 100 mg./kg., with normotensive rats, no clear action was noted on 3 rats and an immediate hypotension of 20% average which lasted for 2 hours was noted on 3 rats, which was slower with return action after 6 hours on one other.

With hypertensive rats there was noted.—A hypotension of 54% on average on 2 rats which lasted from 30 minutes to 1 hour after injection and was maintained for more than 6 hours.

At 500 mg./kg. on 2 normotensive rats, a hypotension of 41% on average was noted after between 30 minutes and 1 hour, the maximum being obtained after 3 to 4 hours. One of the treated rats showed an increase after 4 hours and the other showed a low pressure and died the following day.

At 1000 mg./kg. on 1 normotensive rat, a hypotension of 56% was noted, 30 minutes after ingestion of the product, which lasted for more than 6 hours, the animal dying the following day.

(b) Study of a chronic treatment by buccal administration: 5 rats received the product in a dose of 100 mg./kg. per day for 4 days. Their pressure was measured by a non-sampling method each day, before administration of the product and at hourly intervals after administration, on the first day for 6 hours and on the other days for 3 to 4 hours.

In the course of the first day of treatment, the pressure of the animals decrased by 23%, 30 minutes after administration, and there was a progressive increase (after 6 hours, the drop of pressure was no more than 10%). On the other days, no decrease of pressure was noted.

On the fifth day, the animals received the product I.P. at 50 mm./kg., the pressure dropped by 24% rapidly and returning to its initial level 3 hours after injection.

(6) Arterial pressure in anaesthetised cats

The animals were anaesthetised with nembutal. In a dose of 12 mg./kg. I.V. (⅒ $DL_{50}$ I.V. mice) on 1 cat, the product:

Caused a hypotension of 8%,
Slowly increased the hypertensive action of angiotensine,
Did not modify the hypotensive action of isoprenaline,
Diminished for more than 1 hour the response of the nictitating membrane to stimulation of the preganglionic fibre of the cervical sympathesis.

It should be noted that, on the hypogastric nervedeferens canal of the guinea pig, the product at 12 micrograms/ml. did not modify the response to transmural stimulation (4 organs) and that it diminished the response to stimulation of the preganglionic fibre of the nerve (2 organs).

(7) Cardiovascular actions in anaesthetised dogs

The dogs were anaesthetised with a mixture of penthiobarbital and chloralose.

At 12 mg./kg. I.V. on one dog (1/10 $DL_{50}$ I.V. mice), the product:

Decreased arterial pressure by 17% for more than 40 minutes,
Did not modify the cardiac frequency,
Did not modify the systolic pressure in the right ventricle,
Decreased the amplitude of beating of the right auricle by raising the diastolic pressure and decreasing the systolic pressure,
Did not modify the pressure actions of drenaline and isoprenaline,
Decreased and then briefly increased (3 minutes) the femoral arterial output.

At 30 mg./kg. I.V. perfused for 10 minutes (¼ $DL_{50}$) on 2 dogs, the product:

Slightly decreased the arterial pressure (−9% and −19%),
Did not modify cardiac frequency,
Virtually did not modify cardiac output (−12% in 1 dog),
Diminished the cardiac effort by 19% on average,
Did not modify the periphery resistance of 1 dog and diminished it by 18% in the other dog.

New tests have also been carried out with a new sample of the product of Example 1 made semi-industrially. This is reference sample No. 2.

The following results have been obtained:

(I) ACUTE TOXICITY IN MICE

By gastric administration, no mortality up to a dose of 2 g./kg. was noted.

(II) TOLERANCE TO REFERENCE PRODUCT NO. 2 AND ACTION ON A.P. OF AWAKENED DOGS (1) I.M. administration—40 mg./kg. (1/20 $DL_{50}$ mice I.V.) there was observed:

(a) a very good tolerance; normal behaviour, absence of pain at the point of injection;
(b) a weak hypotensive action;
before injection, the pressure was 126 mm. Hg, the frequently 120 pulses per minute;
30 min. after injection, the pressure was 108 mm. Hg, the frequency 140 pulses per minute;
50 min. after injection, the pressure was 115 mm. Hg, the frequency 130 pulses per minute.
3 hours after injection, the pressure was 112 mm. Hg, the frequency 110 pulses per minute;
5 hours after injection, the pressure was 108 mm. Hg, the frequency 100 pulses per minute;
The following day, the pressure was 124 mm. Hg, the frequency 110 per minute.

(2) Buccal administration—At 100 mg./kg. there was observed:

(a) an excellent tolerance and normal behaviour;
(b) no action or arterial pressure and cardiac frequency;
before administration, the pressure was 107 mm. Hg, the frequency 130 pulses/minute;
30 min. after administration, the pressure was 100 mm. Hg, the frequency 130 pulses/minute;
50 min. after administration, the pressure was 930 mm. Hg,
2 hours 30 mn. after administration, the pressure was 100 mm. Hg, the frequency was 120 pulses/minute;
50 min. after administration, the pressure was 930 mm. Hg,
2 hours 30 mn. after administration, the pressure was 100 mm. Hg, the frequency was 120 pulses/minute;
4 hours after administration, the pressure was 100 mm. Hg, the frequency was 120 pulses/minute.

In summary, the products of the invention are very well tolerated by dogs by the I.M. and Buccals methods of administration. The moderated hypotensive action is manifested particularly by the I.M. route.

In conclusion, the following results have been observed about the behaviour of the product of the invention:

Toxicity in mice:

I.V. $DL_{50}=120\pm8.7$ mg./kg.
I.M. $DL_{50}$ between 600 and 1000 mg./kg.;
Buccal $DL_{50}>1$ g./kg.

Action on arterial pressure:

I.V. at 12 mg./kg. (1/10 $DL_{50}$ I.V. mice),
Anaesthetised rat: hypo- then hypertensive,
Anaesthetised rabbit: hypotensive
Anaesthetised cat: very slightly hypotensive,
Anaesthetised dog: hypotensive.
I.M. at 50 mg./kg. (1/12 $DL_{50}$ I.M. mice): hypotensive in awakened rats.

Buccal admn. at 100 mg./kg.: hypotensive on first ingestion, none after other administrations in awakened rats.

Cardiovascular action in anaesthetised dogs:

At 30 mg.:kg. at 10 minutes I.V. (¼ $DL_{50}$ mice);
Hypotension not due to a reduction in cardiac frequency or to peripheral dilatation;
diminution of the peripheral vascular resistance and cardiac effort.

Cardiovascular action in awakened dogs:

Hypotensive action moderated by I.M. administration at 40 mg./kg.;
No hypotensive action by Buccal administration at 100 mg./kg.;

The tolerance is good by I.M. and Buccal administration in awakened dogs.

Also, the action on the heart in anaesthetised dogs has been studied in the following manner:

An electrocardiogram has been recorded, with integration of the cardic frequency after slow perfusion of the derivative intravenously in a dose of 15 mg./kg. No modification of the electrocardiographic trace was observed. The cardiac frequency was virtually untouched.

A clinical test described below has been carried out particularly with the product corresponding to Example 1.

(I) Buccal administration

Reference product No. 2 of Example No. 1 was administered per os to 10 hypertensive men in a dose of 300 mg. per 24 hours. The total daily dose was divided into 3 cachets corresponding to the following formula:

3,4 - dioxymethylene-mandelamidine hydrochloride—100 mg.
lactose—q.s.p. one cachet.

In all cases, the test was carried out on patients hospitalised for at least 7 days and without modification of any parameter likely to modify arterial pressure (regime, activity or other therapy). The base arterial pressure was determined in the 3 days preceding the therapeutic test (between the 7th and 10th days of hospitalisation) and was effectively measured by the Vaquez apparatus, and the palpatory and auscultatory methods. The average base pressure was the average of 9 measurements effected during the 3 days preceding the therapeutic test.

In the conditions of the therapeutic test, in particular at the doses administered, the product showed itself to be a hypotensive compound of remarkable and constant activity, perfect tolerance and no secondary effects.

It produced in 10 patients (3 malign hypertensions and 7 moderated hypertensions) an average tensional decrease of ≃60 mm. Hg. for the systolic pressure and of ≃40 mm. Hg for the diastolic pressure, or a success percentage of 100% and percentage of good results of 100% (allowing as the criterion for a "good result" the obtaining of a decrease in tension of greater than 40 mm. Hg for the systolic pressure and the obtaining of a degree of improved diastolic pressure of 100 mm. Hg or below).

No non-tolerance nor secondary effect was noted.

(II) Intramuscular administration

The product administered I.M. to 3 normotensive men in a dose of 50 mg. by a single injection revealed a powerful and constant hypotensive activity, which was both early (revealed in less than 30 minutes) and prolonged (lasting for over 3 hours), without secondary effects.

The active principle was used in ampoules containing 100 mg. of product in 10 ml. of physiological serum.

As a general conclusion, under the conditions of the therapeutic tests and doses utilised, the medicament of the invention shows a remarkable constant hypotensive activity and excellent tolerance.

The indications for use of the medicament according to the invention are:

On the one hand, for arterial hypertension whatever its gravity and etiology,
On the other hand, for haemorrhagic or ischemic vascular complications of arterial hypertension (cerebral, coronary, visceral or of the limbs) which favours or induces hypertension.

Utilisation of the medicament is also indicated for oral treatment (chronic treatment) or parenteral (emergency treatment).

(B)

Activities of 3,4-methylenedioxy-mandelamidoxime hydrochloride (Example 6).

(I) VERIFICATION OF THE ACUTE TOXICITY AND CONVULSION-PRODUCING PROPERTIES (1) In the mouse Intravenous administration in the mouse: at 800 mg./kg., the death was observed of 2 animals out of 12 tested.

The symptoms observed are; intense clonic convulsions which last 24 hours in some animals without bringing about death.

Buccal administration in the mouse: no mortality up to the dose of 3 g./kg. From 2 g./kg., the animals show a phase of excitation without convulsion followed by a sedation.

(2) In the rat

Buccal administration: the dose of 500 mg./kg. causes convulsions in 2 rats out of 5, ptosis on 4 rats out of 5. No mortality.

Buccal administration: the dose of 1 g./kg. causes ptosis, convulsions, hypotonia, a paralysis of the hind-quarters, hypothermia. The animal is dead 24 hours after having received the dose.

(II) CARDIOVASCULAR PROPERTIES (1) Isolated rabbit heart

Without barium chloride—The product at the dose of 100 γ/ml. on two hearts:

Hardly increases the coronary output
Exerts a positive inotropic effect
Does not modify the rhthym.

With barium chloride—The tests were carried out on three hearts: the product at the dose of:
100 γ/ml. (1 test):
Increases the output by 33%
Increases the amplitude by 28%
Reduces the rhythm by 33%
500 γ/ml. (2 tests):
Increases the output by +35% and 66%
Exerts a variable effect on the amplitude —40% +14%
Does not modify the rhythm.
1 mg./kg. (1 test):
Increases the output by +82%
Reduces the amplitude —69%
Does not modify the rhythm.

(2) Arterial pressure of the awakened rat

Intramuscular administration: On three rats, one hypertensive and two normotensive, the product at the dose of 185 mg./kg. reduces the arterial pressure by 40%. The action begins in 10 to 30 minutes. No return to normal is observed even after 6 hours.

Buccal administration: On three normotensive rats, the product at the dose of 390 mg./kg. per os reduces the arterial pressure by 24% on average after 60 to 90 minutes. The effect starts in 30 to 60 minutes and stops in 90/120 minutes for 2 rats and extends for more than 5 hours for the third.

(3) Arterial pressure of the anaesthetised rabbit

The product at the dose of 77.5 mg./kg. I.V. reduces by an average of 49% the arterial pressure of three rabbits after 3 hours. The effect begins in 15 minutes and extends for more than 5 hours.

(4) Cardiovascular action in the anaesthetised dog

The product at the dose of 77.5 mg./kg. in intravenous perfusion was administered to a dog.

The results are as follows:

Fleeting increase by 25% of the differential arterial pressure by rise in the systolic pressure.
Very slight increase (+9%) of the average arterial pressure which passes from 80 to 87 mm. of mercury.
Slight reduction (—14%) of the arterial pressure in the right ventricle after 15 minutes.
Reduction in the cardiac frequency —32% after 15 minutes.

The rhythm passes from 155 to 105 pulses/minute.

Increase in the cardiac output and especially in the systolic output (78% after 15 minutes).
Increase in the cardiac index +20% after 15 minutes
Increase in the "stroke volume index" by 20% at the end of perfusion and by 77% after 15 minutes.
Increase by 20% in the left ventricular operation for 15 minutes.
Reduction in the peripheral resistance by 16% after 15 minutes.

The claims defining the invention are as follow:
1. A mandelamidine of the formula:

$$\underset{CH_2-O}{\overset{O-}{\phantom{X}}}\!\!\!\!\diagdown\!\!\!\bigcirc\!\!\!\diagup\!\!\!-CHOH-C\underset{\diagdown N-R'}{\overset{\diagup NH}{\phantom{X}}} \quad (I)$$

in which R represents a hydrogen atom, or a lower alkyl radical having not more than 9 carbon atoms, and R' represents a hydrogen atom, or an OH group or a lower alkyl radical having not more than 3 carbon atoms, their optically active isomers and their addition salts with physiologically acceptable acids.

2. 3,4-dioxy-methylene-mandelamidine, its optically active isomers and its addition salts with physiologically acceptable acids.

3. 3,4-methylenedioxy-mandelamidoxime, its optically active isomers and its addition salts with physiologically acceptable acids.

4. N,N-dimethyl-3,4-dioxymethylene-mandelamidine and its addition salts with physiologically acceptable acids.

5. N,N-diethyl-3,4-dioxymethylene-mandelamidine and its addition salts with physiologically acceptable acids.

6. N-isopropyl-3,4-dioxymethylene-mandelamidine and its addition salts with physiologically acceptable acids.

References Cited

UNITED STATES PATENTS 3,394,181   7/1968   Bell _____ 260—340.5 X

OTHER REFERENCES

Bristow: "Journ. Chem. Soc." (Eng.), 1957, p. 513.

Duteil et al.: "Chemical Abstracts," vol. 71, 1969, col. 89911j and 89912k.

ALEX MAZEL, Primary Examiner

J. H. TURNIPSEED, Assistant Examiner

U.S. Cl. X.R.

424—282